United States Patent [19]

Andrews

[11] Patent Number: 5,643,342
[45] Date of Patent: Jul. 1, 1997

[54] FUEL PELLET AND METHOD OF MAKING THE FUEL PELLET

[75] Inventor: Michael R. Andrews, Chaffee, N.Y.

[73] Assignee: PelleTech Fuels, Inc., Delevan, N.Y.

[21] Appl. No.: 510,303

[22] Filed: Aug. 2, 1995

[51] Int. Cl.$^6$ .................... C10L 5/00; C10L 7/00
[52] U.S. Cl. ................ 44/530; 44/553; 44/589; 44/590
[58] Field of Search ............... 44/530, 589, 590

[56] References Cited

U.S. PATENT DOCUMENTS

| | | | |
|---|---|---|---|
| 4,015,951 | 4/1977 | Gunnerman | 44/590 |
| 4,026,678 | 5/1977 | Livingston | 44/589 |
| 4,236,897 | 12/1980 | Johnston | 44/10 A |
| 4,308,033 | 12/1981 | Gunnerman | 44/6 |
| 4,324,561 | 4/1982 | Dean et al. | 44/589 |
| 4,395,265 | 7/1983 | Reilly et al. | 44/589 |
| 4,529,407 | 7/1985 | Johnston et al. | 44/15 D |
| 4,561,860 | 12/1985 | Gulley et al. | 44/594 |
| 4,810,255 | 3/1989 | Fay, III et al. | 44/14 |
| 4,828,573 | 5/1989 | Jelks | 44/598 |
| 4,834,777 | 5/1989 | Endebrock | 44/629 |
| 5,141,526 | 8/1992 | Chu | 44/576 |
| 5,342,418 | 8/1994 | Jesse | 44/589 |

*Primary Examiner*—Ellen M. McAvoy
*Attorney, Agent, or Firm*—Lieberman & Brandsdorfer, LLC

[57] ABSTRACT

A fuel pellet and a method of manufacturing a fuel pellet capable of burning in either a stoker or pulver furnace, comprising from about 0 to about 80% by weight of cellulosic material, from about 20% to about 50% by weight of densified thermoplastic material, and from about 0 to about 50% by weight of coal. The cellulosic material, densified thermoplastic material and coal are ground from about 80 Mesh to about 200 Mesh, and then blended into a mixture wherein the contents are evenly distributed throughout. Following the blending process, the mixture is forced through a pelletizer. As the pellets are removed from the pelletizer they are immediately cooled so that the densified thermoplastic particles do not melt. The resulting fuel pellets produce from about 10,000 BTU per pound to about 16,000 BTU per pound and leave an ash deposit from about 0 to about 6% by weight, and a sulfur dioxide output from about 0 to about 3% by weight.

21 Claims, 2 Drawing Sheets

FUEL PELLET AND METHOD OF MAKING THE FUEL PELLET

BACKGROUND OF THE INVENTION

1. Field of the Invention

The present invention relates to a fuel pellet comprised primarily of cellulosic materials and densified thermoplastic materials. More particularly, the present invention relates to a method of manufacturing a fuel pellet so as to produce a clean and efficient industrial fuel with a high heat output.

2. Discussion of Related Art

Fuel pellets having different compositions of materials have been used for heating since the mid-nineteen eighties. Typically, the fuel pellets are burned in a stoker furnace, and are associated with residential style heating systems.

Due to increased restrictions in landfill requirements by the U.S. Environmental Protection Agency (EPA) and the diminishing quantities of naturally occurring fuels, there is a demand for new sources of energy. In addition, there has been a dramatic increase in cost for establishing new landfills which comply with U.S. Environmental Protection Agency requirements, for paper mill by-products. Recently, the EPA has enforced the requirement of double lining landfills for disposal of paper mill sludge. By converting paper mill sludge into fuel pellets, we not only create an alternative fuel source by recycling a waste product, but we eliminate the expense of double lining landfills. Beginning in 1984 with the first pellet-burning stove by Pyro Industries, there has been an increased interest in creating a pellet fuel comprised of wood based products, agricultural residues, waste paper and dried sludge.

In some foreign countries, such as Sweden, there has been a recent trend toward banning the burning of fossil based fuels for energy. Accordingly, such countries are currently seeking an alternative fuel source without dramatically compromising their energy requirements. By creating new terms of fuel which burn non-recyclable as well as recyclable waste materials, we preserve the environment, recycle otherwise non-disposable waste products, as well as maintain the world's limited quantity of natural fuel sources.

Several fuel pellets comprised of cellulosic materials have been patented. For example, U.S. Pat. No. 4,236,897 to Johnston discloses a fuel pellet comprised of natural cellulosic material and synthetic polymeric thermoplastic material. The cellulosic material being substantially 5 Mesh, having a moisture content of about 5 to about 15 percent by weight, and comprising from about 90 to 99 percent by weight of the fuel pellet. The thermoplastic material is disclosed as being between 5 and 10 Mesh and comprising about 1 to 10 percent by weight of the fuel pellet. Johnston further discloses seven samples of pellets having slightly different compositions, but all within the ranges disclosed. Each of the seven sample fuel pellets were burned in a stoker furnace having three spreader stokers and a vibrating grate. An average fuel analysis of the fuel pellets tested produced 9,160 BTU per pound, and at no time did it exceed 9,180 BTU per pound. Johnston further discloses using binding agents in the composition of the fuel pellet in addition to thermoplastic materials, such as paraffin slack wax and carnauba wax. Such additives are not desirable in our novel fuel pellet, as wax can not properly burn in a pulver furnace. Furthermore, both paraffin wax and carnauba wax would jeopardize the integrity of our novel fuel pellet.

U.S. Pat. No. 5,342,418 to Jesse discloses a method of making a fuel pellet comprised of cellulosic material. The fuel pellet described therein is comprised of 60 to 90 percent by weight of cellulosic material, and 10 to 40 percent by weight of a thermoplastic resin. The heat output of the fuel pellets is between 9,500 and 11,500 BTU per pound. Again, the fuel pellets disclosed in this patent is for use in a conventional stoker furnace and not a pulver furnace. The fuel pellet disclosed by Jesse purposefully produces an ash output of at least 1 percent by weight, so as to protect the equipment which carries the fuel into the furnace. Furthermore, ash is a necessary component for burning particles in a stoker furnace. Ash deposits are not a necessary component of our novel fuel pellet, which is designed for a pulver furnace, and therefore does not require ash deposits to maintain the burning cycle.

Other examples of patented fuel pellets and methods of making fuel pellets include: U.S. Pat. No. 5,141,526 to Chu disclosing a process for making fuel from waste sludge containing water, solids and oil; U.S. Pat. No. 4,810,255 to Fay, III et al. disclosing a method of manufacturing a fuel comprised of wood chips and wax; U.S. Pat. No. 4,529,407 to Johnston et al. disclosing a fuel pellet comprised of 97 to about 99 percent by weight of cellulosic material and about 1 to 3 percent by weight of thermoplastic material.

While each of the above described fuel pellet compositions and methods of making the fuel pellets function adequately, they each have drawbacks. The major drawback is that the fuel pellets described in the above cited references are not designed to burn in a pulver furnace. Each of the above described fuel pellets is designed to burn in a stoker furnace, and is therefore most desirable for a residential style furnace. Furthermore, the Chu fuel pellet and the Fay, III et al. fuel pellet each disclose the use of oil and wax particles, as well as thermoplastic films as part of the composition of the fuel pellet. The use of oil and wax based particles are not present in our novel fuel pellet. An important characteristic of our novel fuel pellet is that it burns in expansion, and that each of the particles within the pellet burn separately. The novel fuel pellet only functions properly if it's particles are bound together prior to burning, but break into their individual particles in the furnace. By mixing oil into the composition, we would jeopardize the ability of the pellet to maintain its shape. Additionally, wax is not capable of burning in a pulver furnace. By mixing wax into the composition, we not only jeopardize the integrity of the pellet, but are left with the remains of the wax after the burning process, which must then be disposed.

Fuel pellets and other substances which are burned in a pulver furnace burn in expansion. As the pellet is placed in the pulver furnace, the pellet expands and breaks into the original particles which comprise the fuel pellet. Therefore, it is a requirement that all of the substances of the fuel pellet composition be capable of burning in a pulver furnace. For example, thermoplastic films are not capable of burning properly in a pulver furnace. Accordingly, what is desirable is a fuel pellet comprised of cellulosic materials, densified thermoplastic materials, coal and other cellulosic based waste materials for burning in a pulver or stoker style furnace and producing a heating output of up to 16,000 BTU per pound.

SUMMARY OF THE INVENTION

It is therefore an object of the present invention to provide a fuel pellet made from waste products comprising cellulosic materials, densified thermoplastic based films, coal, and other cellulosic based waste products, wherein the fuel pellet is capable of generating a high heat output greater than that of coal.

Additionally, it is a further object of the invention to provide a fuel pellet which can burn efficiently in either a stoker or pulver furnace.

Furthermore, it is a further object of the invention to provide a fuel pellet wherein the cellulosic materials, the densified thermoplastic, and all other particles within the fuel pellet maintain their integrity when burning.

It is yet another object of the invention to provide a fuel pellet as an alternative fuel source having an ash content of about 0 to about 6% by weight, and having a sulfur dioxide output of about 0 to about 3% by weight.

It is a further object of the invention to provide a fuel pellet comprised of diaper stock.

It is yet a further object of the invention to provide a fuel pellet as an alternative fuel source having an energy output of up to 16,000 BTU per pound.

Other and further advantages and aspects of the present invention will become more apparent to those skilled in the art in view of the following description and the accompanying drawings.

BRIEF DESCRIPTION OF THE DRAWINGS

The present invention will now be described in detail with reference to the attached drawings. It is understood that the invention is not intended to be limited to the precise arrangement of instrumentalities shown.

DETAILED DESCRIPTION OF THE PREFERRED EMBODIMENTS

The Fuel Pellet

An embodiment of the invention will now be described with reference to the drawings wherein like numerals refer to like parts.

A focus of the present invention is to provide both a novel fuel pellet and a method of manufacturing the fuel pellet. This fuel pellet is unique in that it is comprised of an abundant amount of small particles thereby providing the fuel pellet with strong and unique burning characteristics. The fuel pellet is capable of burning in expansion in either a pulver or stoker style furnace, where the particles which comprise the pellet maintain the integrity of the original materials.

Figure 1:
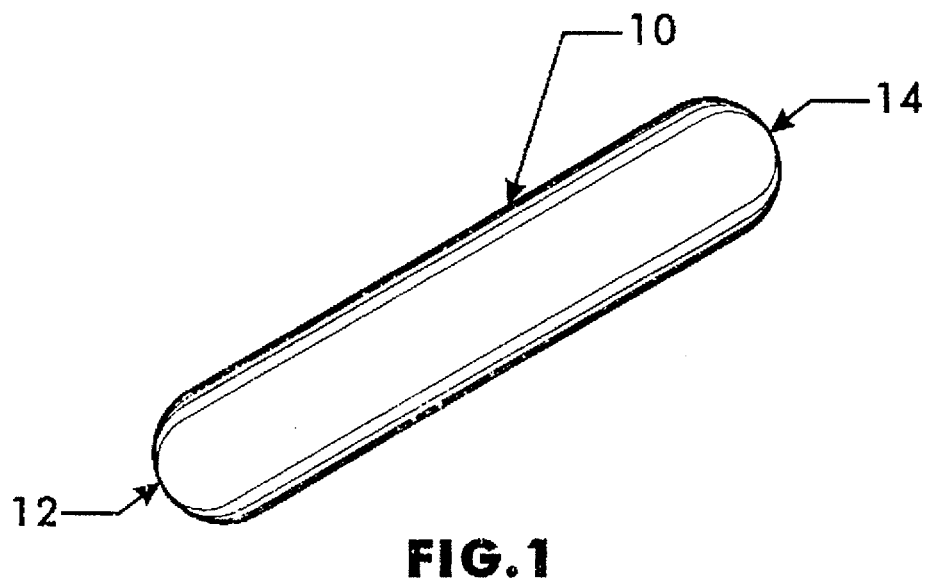
FIG. 1 illustrates a perspective view of a fuel pellet prepared according to the present invention.

Referring now to the drawings, FIG. 1 illustrates the fuel pellet 10 of the invention. The fuel pellet has a substantially symmetrical and cylindrical type shape having a first convex end 12 and a second convex end 14. The fuel pellet 10 is comprised of discrete particle between 80 and 200 Mesh. Ideally, the size of the fuel pellet is about ½ inch in diameter and not greater than about ¾ inch in diameter, and about ¾ inch in length, but not greater than about 3 inches in length. The size of the pellet is determined according to the specifications of the furnace in which it is intended to be burned and the desired heat output to be achieved. The particles which comprise the fuel pellet are blended together into a near homogeneous mixture of the discrete particles. As a result of the unique quality of the fuel pellet, there are no layers of separate material which burn off as the fuel pellet burns, rather each of the individual particles burn independently and simultaneously.

The fuel pellet 10 of the present invention is comprised of a selected composition of waste byproducts. Preferred products which comprise the fuel pellet are cellulosic and thermoplastic materials. In a preferred composition, the fuel pellet is comprised of 0 to about 80% by weight of cellulosic material, from about 0 to about 50% by weight of coal, and from about 20% to about 50% by weight of densified thermoplastic particles. In a preferred embodiment, the pellet is from about 50% to about 55% percent by weight of cellulosic material, such as paper mill sludge and wood chips, and from about 45% to about 50% by weight of densified thermoplastic material. The preferred composition of the fuel pellet has a heat output of from about 12,000 BTU per pound to about 16,000 BTU per pound. All of the particles which are present in the fuel pellet are in particulate form and have been ground into particle sizes of at least 80 Mesh and as fine as 200 Mesh. The ideal composition of the fuel pellet when used as a fossil fuel replacement, with a clean output, is from about 80% to about 85% by weight of cellulosic material, and from about 15% to about 20% by weight of densified thermoplastic material. During combustion, the fuel pellets generate a heat output from about 10,000 BTU per pound to as much as about 16,000 BTU per pound. The fuel pellets further produce between about 0 and about 3% by weight of sulfur dioxide during combustion, and between about 0 and about 6% by weight of ash.

Figure 2:
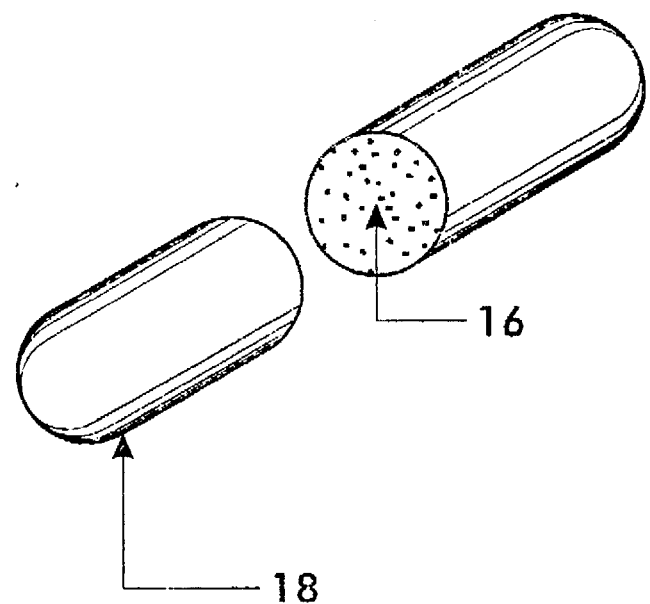
FIG. 2 illustrates a section view of a fuel pellet prepared according to the present invention.

The fuel pellet is formed in an extrusion process, thereby allowing the particles within the pellet to maintain their original integrity. The particles do not fuse together to form one cohesive and continuous piece of material. Upon burning in a pulver furnace, the pellet breaks into its original particulate components and each particle burns separately and in expansion. It is important that the densified plastic as well as the other particles present in the fuel pellet maintain their particulate form. The particulate quality of all the components assures efficient burning of the densified thermoplastic material as well as the cellulosic materials, or any other particles comprising the fuel pellet. FIG. 2 illustrates the shape and composition of the fuel pellet having a cylindrical shaped body comprised of individual particles of cellulosic materials and densified thermoplastic particles as shown at 16. The fuel pellet further comprises an external protective coating 18 which is formed during the pelletizing process.

In a further embodiment, the cellulosic material of the fuel pellet is comprised of paper mill sludge, wood chips, paper fiber, and other naturally occurring cellulosic waste products, such as cherry pits, olive pits, sugar cane (bagasse), grass clippings, and/or fur trees, ie. christmas trees. In addition, the fuel pellet further comprises between 0 and about 3% by weight of potato starch particles. The potato starch particles act as a binder among the cellulosic material and the densified thermoplastic particles, as well as the coal when used in the composition of the fuel pellet.

In an alternative embodiment, the fuel pellet is comprised of diapers, incontinent products, as well as sanitary napkins. Due to the breakdown of materials comprising diaper products and the like, the diaper pellet is comprised of products similar to that of the fuel pellet manufactured of cellulosic materials and densified plastic. The diaper like products are comprised of fiber, thermoplastic material, and super absorbent polymers. The process of manufacturing the diaper pellets comprises the steps of: separating the fiber and thermoplastic material from the absorbent polymers, pulverizing the fiber and thermoplastic material to about 80 Mesh, and pelletizing the fiber and thermoplastic material. In a preferred embodiment, the diaper and diaper like products are reduced to at least 200 Mesh during the pulverizing process, and prior to being pelletized. Accordingly, as the diaper pellet is burned in a pulver furnace, the diaper pellet produces up to 16,000 BTU per pound.

Method of Manufacturing the Fuel Pellet

Figure 3:
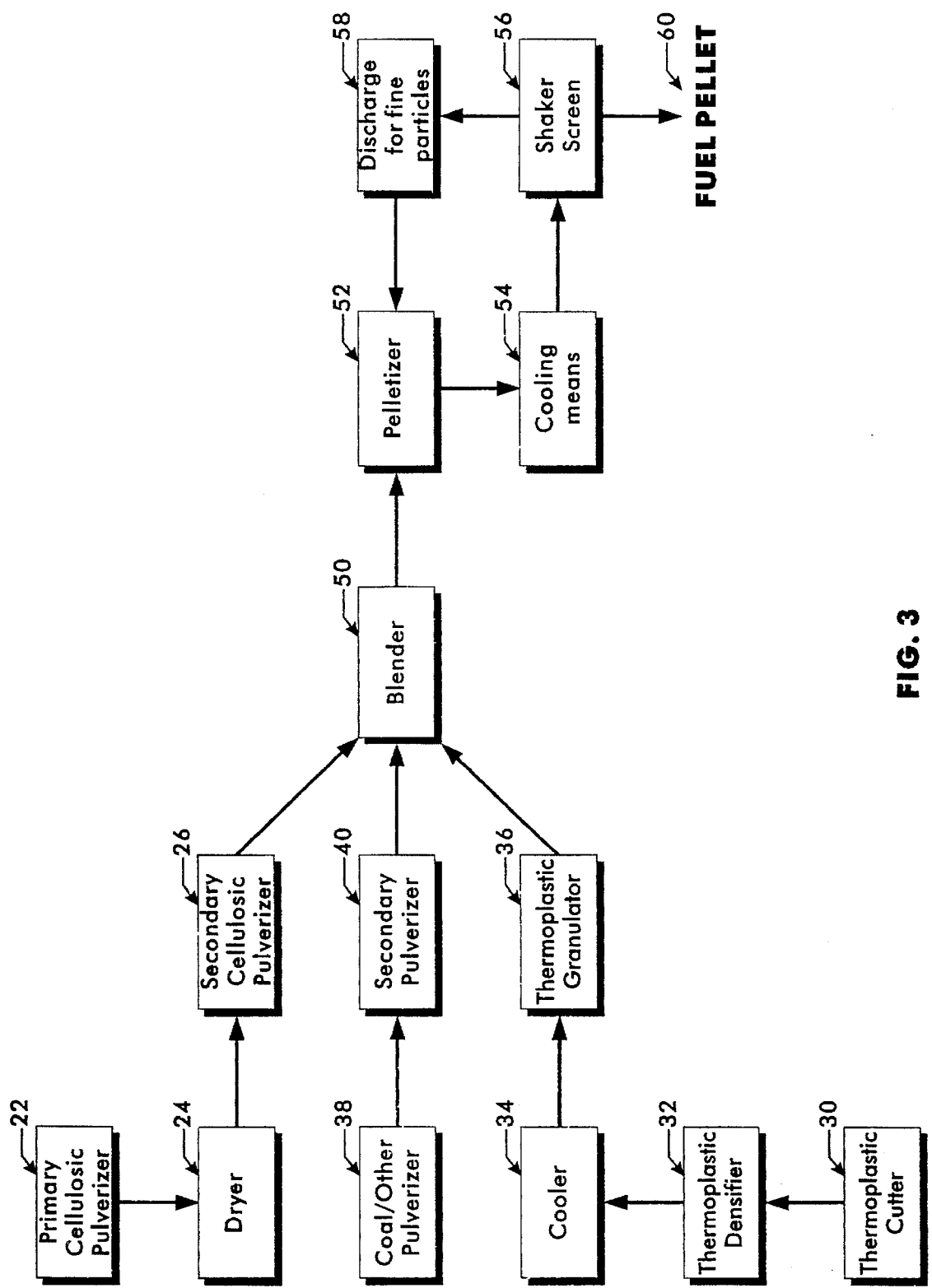
FIG. 3 is a flow chart illustrating the process of the present invention for creating the fuel pellets.

FIG. 3 illustrates the method of making the fuel pellet of the disclosed invention. The process for manufacturing the novel fuel pellet is initialized by grinding of the cellulosic material to 80 Mesh or smaller by feeding the cellulosic material to an initial wood chip or paper sludge pulverizer, also known as a primary cellulosic pulverizer 22, which reduces the cellulosic material to a predetermined size. The cellulosic material can be ground to a size as fine as 200 Mesh. The size of the particles within the fuel pellet is significant in producing a fuel pellet that burns efficiently and leaves minimal residue, such as ash, which would have to be disposed in a waste site. In a pulver furnace, the fuel pellet burns in expansion. The fuel pellet breaks into it's discrete particles as it enter the furnace and burns. Therefore, smaller particles within the pellet are capable of burning quicker, due to their size and density.

Following the initial grinding of the cellulosic materials to at least 80 Mesh, the cellulosic materials are fed through a dryer 24, as shown in FIG. 1, such as the MEC Triple Pass Dryer System. The dryer 24 ensures that the moisture content of the cellulosic material is at least about 2% by weight and not greater than about 10% by weight. The dryer 24 has a self regulating conveyance system which results in the cellulosic material being discharged at a predetermined moisture content. On average, the moisture of the novel fuel pellet should be at least about 5% by weight and not greater than about 10% by weight. The moisture content of the cellulosic material is significant to the integrity of the novel fuel pellet, due to the fact that the moisture content of the cellulosic material assists in bonding all of the materials in the composition prior to and following the pelletizing of the composition. However, an increase in the moisture of the cellulosic material beyond the disclosed limit would jeopardize the characteristics of the fuel pellet and its ability to withstand being transported. Although the novel fuel pellet breaks up into discrete particles as it burns in a pulver furnace, it is important that the pellet maintain its integrity prior to burning. Furthermore, the fuel pellet must be weather resistant and rigid enough to be handled mechanically without crumbling. Accordingly, achieving the proper and desired moisture content of the fuel pellet is of critical importance in achieving the desired heat output and in maintaining the ability to transport the fuel pellets without jeopardizing the integrity, shape and composition of the pellet.

After the wood chips, paper sludge and any other cellulosic material have been sufficiently dried to the desired moisture content, the cellulosic material are fed through a secondary pulverizer 26. This secondary pulverizer 26 is the final grinding process for the cellulosic materials. Particles have a tendency to expand and/or shrink according to their moisture level. Therefore, it is critical that the cellulosic material be placed through a secondary pulverizer 26 to ensure that they are reduced to the proper size according to the specifications of the particular fuel pellets being manufactured.

In a separate procedure, the thermoplastic materials are received at the manufacturing facilities in bales having dimensions of approximately 4 feet wide, 6 feet long and 1 foot high. Accordingly, the initial step in preparing the thermoplastic materials is to cut the bales into 1 foot cubed sections. This cutting process is performed by means of a thermoplastic cutter, as indicated at 30.

After the thermoplastic materials have been reduced to 1 foot cubed sections, the thermoplastic based films are densified by means of a thermoplastic densifter 32 through the use of an agglomeration process. The densification process allows for creating a final composition of thermoplastic materials together with cellulosic materials as well as other materials, and avoids several inherent problems in creating this composition. Densification of the thermoplastic material eliminates static electricity, which is a characteristic of the thermoplastic material in its film phase. Prior to densifying the thermoplastic films, it is difficult to cut, mix or blend the thermoplastic material together with other materials that comprise the fuel pellet. Accordingly, the densification of the thermoplastic material allows for the thermoplastic material to be mixed and blended in a controlled manner with other particles comprising the fuel pellet.

Immediately following the agglomeration process, the densified thermoplastic materials are cooled by means of a cold water wash or by liquid nitrogen. The cooling process 34 gives the densified plastic a brittle characteristic, which allows the plastic to be cut or ground into the exact particle size need for the particular boiler demand. When liquid nitrogen is the means used for cooling the densified thermoplastic material, the thermoplastic can then be ground up into particles as fine as 200 Mesh. However, when a cold water wash is the means used for cooling the densified thermoplastic material, the thermoplastic material does not cool as quickly or efficiently and cannot be ground up into particles as fine as 200 Mesh. Therefore, the particular needs for the fuel pellet being created dictates the various options which can be utilized in creating the novel fuel pellet.

After the densified thermoplastic material has been sufficiently cooled, the densified thermoplastic materials are placed through a thermoplastic granulator 36. This process is similar to the grinding of the cellulosic materials. The densified thermoplastic materials are placed through the thermoplastic granulator 36 and reduced to a size of at least 80 Mesh and as fine as about 200 Mesh. The exact size of the densified thermoplastic particles is determined according to the specification of the fuel pellet being manufactured.

While the cellulosic materials and densified thermoplastic materials are being prepared, as indicated at 22, 24, 26, 30, 32, 34 and 36, in the event coal has been determined as a necessary component of the fuel pellet, coal is also processed and prepared. In a process similar to the pulverizer of the cellulosic material as indicated at 22 and 26, the coal is reduced to the proper particle size by means of a separate and initial coal pulverizer 38. Following this initial grinding, the coal is placed through a secondary coal pulverizer 40, to ensure that the coal particles have been sufficiently reduced to the particle size required for the fuel pellet composition.

Due to the different operating means of a pulver furnace and a stoker furnace, there is a need for adjusting the composition of the novel fuel pellet, so as to accommodate the standards of the particular furnace for which the fuel pellet is being manufactured, and to control the desired output of the fuel pellets. Every quantity of cellulosic material that passes through the manufacturing system will have different compositions. Therefore, in order to produce a most efficient burning of the fuel pellet, and the components therein, it is necessary to analyze the cellulosic material in consideration of the specific furnace needs of the novel fuel pellet.

Following the analysis of the cellulosic material and the determination of the furnace specifications, the components of the novel fuel pellet are blended together by means of a blender 50. Due to the fact that all of the components of the composition have been cooled and have taken on a hardened characteristic, the integrity of the particles are not affected by the blending process. Every fuel pellet composition is unique and different, due to the specific requirements of the furnace and the nature of the cellulosic material. The greater the amount of densified thermoplastic material that is present in the composition of the fuel pellet, the longer the blending process will take. The densified thermoplastic material requires more time to blend with the remainder of the particles.

After the components of the fuel pellet have been sufficiently blended together, they are processed and forced through a pelletizer 52. This step of the manufacturing of the fuel pellet forces the blended composition through a die of a pelletizer machine, thereby creating the novel fuel pellets. It is important that melting of the densified plastic not occur during pelletizing of the composition mixture, as melting would affect the integrity of the particles within the fuel pellet. The fuel pellets exit the pelletizer at a temperature of about 270° Fahrenheit and not greater than 300° Fahrenheit. Melting of densified thermoplastic materials occurs at 300° Fahrenheit. When the novel fuel pellet exits the pelletizer, there is a slight coating on the external surface of the pellet, which also serves as a protective coating to the pellet as shown at 18. This coating is caused by Lignin, which is a naturally occurring substance of the cellulosic material, and from the densified thermoplastic particles.

The fuel pellets are created in a round shape, and maintain this shape upon exiting the pelletizer 52. This shape is critical to promote efficient and complete burning of the fuel pellet. If the heat generated by the pelletizer is 300° Fahrenheit or greater then a thicker die may be used, so as to reduce the heat being generated without jeopardizing the integrity of the particles within the fuel pellet.

Following the formation of the fuel pellets by means of the pelletizer 52, the fuel pellets are cooled down by a cooling means 54, such as an air cooler, an air conditioner, or by liquid nitrogen means. The cooling down process of the fuel pellets causes the pellets to harden into the shape created by the pelletizer, and allows the components of the pellet to maintain their integrity without having the individual components melting or mixing together. Melting of the densified plastic particles within the pellet would jeopardize the composition of the fuel pellet and affect the burning of the pellet in a pulver furnace.

In a preferred embodiment, after the fuel pellets have been sufficiently cooled and hardened, the fuel pellets are placed through a shaker screen 56. This process separates the fine and discrete particles of the composition which from the fuel pellets. i.e. the excess particles. The discharge for the fine particles are separated from the fuel pellet, as indicated at 58, and are then again forced through the pelletizer 52, as indicated at 58 and 52. This process minimizes the waste generated by any excess particles that comprise the fuel pellet. Accordingly, the discharge of the final fuel pellets, as indicated at 60, is the collection of the completed fuel pellets.

Those skilled in the art will now see that certain rearrangements, modifications and alterations can be made to the fuel pellets using selected waste materials, cellulosic materials, coal and thermoplastic based films, herein disclosed with respect to the preferred embodiments, and the methods of fabrication and burning thereof, without departing from the spirit of the invention. All such arrangements, modifications and alterations are intended to be within the scope of the appended claims.

What is claimed:

1. A fuel pellets comprising:

from about 0 to about 50% by weight coal;

from about 0 to about 80% by weight of cellulosic material;

from about 20% to about 50% by weight of densified thermoplastic material;

the thermoplastic material being discrete particles throughout the pellet and being at least 80 Mesh;

the cellulosic material having a moisture content from about 2% to about 10% by weight; and the cellulosic material being about 80 Mesh.

2. The fuel pellet of claim 1, wherein the cellulosic material is selected from the group consisting of paper mill sludge, wood and paper fibers, and combinations thereof.

3. The fuel pellet of claim 2, wherein the cellulosic material is selected from the group consisting of cherry pits, olive pits, sugar cane (bagasse), grass clippings, fur trees and other cellulosic materials, and combinations thereof.

4. The fuel pellet of claim 1, wherein the cellulosic material being between 80 and 200 Mesh.

5. The fuel pellet of claim 1, wherein the coal being between 80 and 200 Mesh.

6. The fuel pellet of claim 1, wherein the densified thermoplastic material being between 80 and 200 Mesh.

7. The fuel pellet of claim 1, wherein said pellet having a heat output from about 12,000 BTU per pound to about 16,000 BTU per pound.

8. The fuel pellet of claim 1, wherein said pellet having a sulfur dioxide output from about 0 to about 3% by weight.

9. The fuel pellet of claim 1, wherein said pellet having an ash output from about 0 to about 6% by weight.

10. The fuel pellet of claim 1, wherein said fuel pellet being about 0.50 inches in diameter to about 0.75 inches in diameter, and about 0.75 inches in length to about 3.00 inches in length.

11. A method for manufacturing a fuel pellet comprising the steps of:

selecting elements of said fuel pellet to manufacture a composition thereof, from about 0 to about 80% by weight of cellulosic material, from about 20% to about 50% by weight of densified thermoplastic material, from about 0 to about 50% by weight of coal, said composition of said fuel pellet comprising from about 2% to about 10% by weight of moisture, pulverizing said cellulosic material to at least about 80 Mesh, reducing the moisture content of the cellulosic material to about 10% by weight and not less than about 2% by weight, pulverizing said cellulosic material a second time, densifying thermoplastic film by an agglomeration process, granulating said densified thermoplastics film to at least about 80 Mesh, pulverizing said coal to at least about 80 Mesh, blending the pulverized and granulated particles to create a composition, and feeding said composition through a pelletizer to form said fuel pellets.

12. The method of manufacturing said fuel pellet of claim 11, further including the steps of:

cooling said fuel pellets upon exiting the pelletizer, processing said fuel pellets through a shaker screen for separating the fuel pellets from any discharges; and feeding said discharges through said pelletizer.

13. The method of manufacturing said fuel pellet of claim 12, wherein said fuel pellet being cooled by means of a cold water wash.

14. The method of manufacturing said fuel pellet of claim 12, wherein said fuel pellet being cooled by means of liquid nitrogen.

15. The method of manufacturing said fuel pellet of claim 11, wherein said fuel pellet having a heat output of at least about 10,000 BTU per pound.

16. The method of manufacturing said fuel pellet of claim 11, wherein said fuel pellet having a heat output of at least about 16,000 BTU per pound.

17. The method of manufacturing said fuel pellet of claim 11, wherein said fuel pellets being about 0.50 inches in diameter to about 0.75 inches in diameter, and about 0.75 inches in length to about 3.00 inches in length.

18. The method of manufacturing said fuel pellet of claim 11, wherein the fuel pellet is consumed in a stoker furnace.

19. The method of manufacturing said fuel pellet of claim 11, wherein said densified thermoplastic being cooled by a liquid nitrogen means upon exiting the agglomeration process.

20. The method of manufacturing said fuel pellet of claim 11, wherein said densified thermoplastic being cooled by a cold water wash upon exiting the agglomeration process.

21. A fuel pellet comprising:

from about 0 to about 80% by weight of cellulosic material;

from about 20% to about 50% by weight of densified thermoplastic material;

the thermoplastic material being discrete particles throughout the pellet and being at least 80 Mesh;

the cellulosic material having a moisture content from about 2% to about 10% by weight; and the cellulosic material being about 80 Mesh.

* * * * *